(12) United States Patent
Benton et al.

(10) Patent No.: US 8,792,759 B2
(45) Date of Patent: Jul. 29, 2014

(54) GIGABIT WET MATE ACTIVE CABLE

(75) Inventors: Mark C. Benton, Itasca, IL (US); Richard Colin Edward Durrant, Crystal Lake, IL (US); Darren Adams, Haverhill (GB); Wojciech Przeczkowski, Des Plaines, IL (US)

(73) Assignee: Advanced Fiber Products, LLC, Des Plaines, IL (US)

( * ) Notice: Subject to any disclaimer, the term of this patent is extended or adjusted under 35 U.S.C. 154(b) by 142 days.

(21) Appl. No.: 13/444,837

(22) Filed: Apr. 11, 2012

(65) Prior Publication Data

US 2012/0263420 A1 Oct. 18, 2012

Related U.S. Application Data

(60) Provisional application No. 61/474,131, filed on Apr. 11, 2011.

(51) Int. Cl.
*G02B 6/44* (2006.01)

(52) U.S. Cl.
USPC ........... 385/101; 385/77; 385/88; 385/92

(58) Field of Classification Search
USPC ............ 385/88–92, 14, 77, 101; 439/201
See application file for complete search history.

(56) References Cited

U.S. PATENT DOCUMENTS

| | | | | |
|---|---|---|---|---|
| 7,090,406 B2 * | 8/2006 | Melton et al. | | 385/62 |
| 7,959,454 B2 * | 6/2011 | Ramasubramanian et al. | | 439/201 |
| 8,488,928 B2 * | 7/2013 | Ishimoto et al. | | 385/101 |
| 2003/0007738 A1 * | 1/2003 | Cairns et al. | | 385/56 |
| 2006/0039644 A1 * | 2/2006 | Belling et al. | | 385/14 |
| 2006/0197943 A1 * | 9/2006 | Kewitsch | | 356/73.1 |
| 2007/0206902 A1 * | 9/2007 | Blauvelt et al. | | 385/49 |
| 2008/0003868 A1 * | 1/2008 | Cairns | | 439/552 |
| 2008/0113539 A1 * | 5/2008 | Cairns et al. | | 439/197 |
| 2009/0238518 A1 * | 9/2009 | Scadden et al. | | 385/59 |
| 2010/0026992 A1 * | 2/2010 | Rosiewicz | | 356/73.1 |
| 2011/0206328 A1 * | 8/2011 | Wang | | 385/94 |
| 2011/0280538 A1 * | 11/2011 | Durrant et al. | | 385/138 |

FOREIGN PATENT DOCUMENTS

| | | | | | |
|---|---|---|---|---|---|
| JP | 54104850 A | * | 8/1979 | | G02B 5/14 |
| JP | 57066412 A | * | 4/1982 | | G02B 7/26 |

* cited by examiner

*Primary Examiner* — Ellen Kim
(74) *Attorney, Agent, or Firm* — Chicago IP Law; Steven M. Evans

(57) ABSTRACT

A combination of a wet mate electrical connector and a gigabit miniature transceiver in a pressure resistant cable plug connector assembly. The cable plug connector assembly includes a wet mate connector, a miniature gigabit transceiver, and electrical and optical connections necessary to convert transmitted electrical data signals to optical data signals and vice versa.

20 Claims, 11 Drawing Sheets

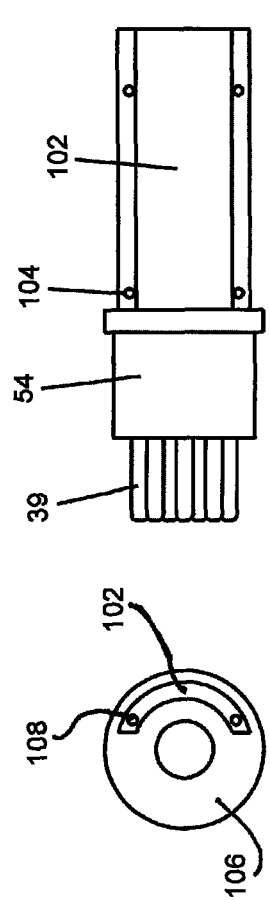
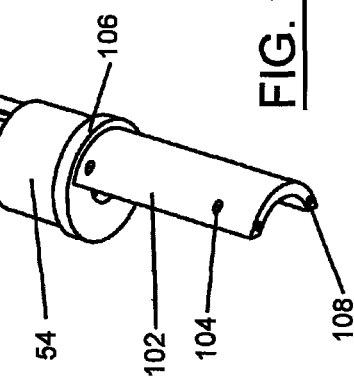
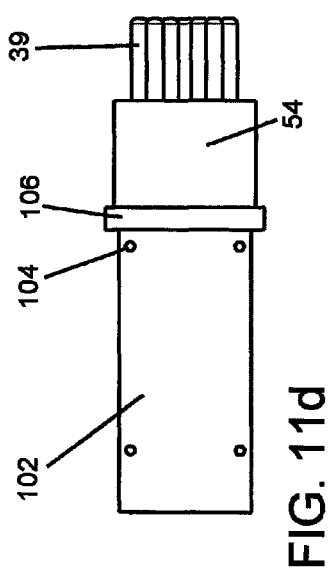
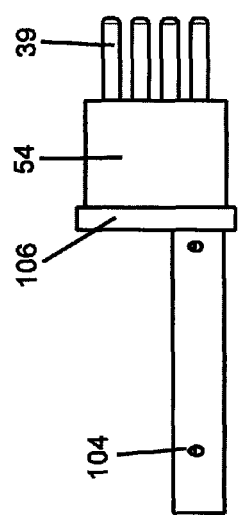
FIG. 11c
FIG. 11a
FIG. 11e
FIG. 11d
FIG. 11b

GIGABIT WET MATE ACTIVE CABLE

REFERENCE TO RELATED APPLICATION

This patent application claims priority to U.S. provisional patent application entitled "Gigabit Wet Mate Active Cable," having Ser. No. 61/474,131, filed on Apr. 11, 2011, the entirety of which is hereby incorporated by reference into the present patent application.

BACKGROUND OF THE INVENTION

1. Field of the Invention

The present invention relates generally to connectors for under water environments, and more particularly, to deep water fiber optic or electro optical hybrid connectors.

2. Description of Related Art

Current wet mate electrical connector and cable technology utilizes ruggedized CAT5 or 6 cables and electrical wet mate connectors of proven design. Unfortunately, CAT 5 or 6 cables are limited in their effective signal communication length to about 100 meters. Additionally, electrical twisted pair cables used in CAT 5 and 6 cables are heavy and bulky and transmitted signals are susceptible to electrical interference. Conversely, fiber optic cables that can be used as an alternative to electrical cables for better signal transmission integrity and for longer transmission distances do not have comparatively low cost fiber optic connector interfaces for reliable low loss and repeatable wet mate connection in adverse submerged environments. All of these attributes are undesirable for a wet mate environment, especially at deep water depths for the reliable low cost transmission of high data rate signals over long distances where repeated mating and unmating of connectors subsea may occur.

Accordingly, there is a need for a deep water connector system that provides the benefits of fiber optic cables for increased transmission distances via the attached cables. Additionally, there exists a need for deep water connector cables which are lighter, less bulky, and more flexible. There also exists a need to combine the benefits of fiber optic subsea cable transmission with the benefits of proven electrical subsea wet mate connector interfaces.

ASPECTS AND SUMMARY OF THE PRESENT INVENTION

In order to overcome these deficiencies in the prior art, the present invention provides a novel combination of wet mate electrical connectors and a gigabit miniature transceiver in a pressure resistant cable plug connector assembly. The cable plug connector assembly includes a wet mate connector, a miniature gigabit transceiver, and electrical and optical connections necessary to convert transmitted electrical data signals to optical data signals and vice versa.

In accordance with one aspect of the present invention, an active cable is provided by incorporating a gigabit transceiver necessary to convert transmitted electrical data signals into optical data signals and vice versa.

An additional aspect of the present invention locates optical connections either de-mountable or permanent inside a pressure resistant fiber cable end of the wet mate connector assembly.

Another aspect of the present invention enables the wet mate gigabit optical cable connector assembly to be protected from and operate at water depths having water pressure levels approaching 10,000 pounds per square inch (psi).

A further aspect of the present invention is to provide data transmission distances in deep water environments exceeding 10 kilometers by using optical gigabit transmission lines made possible by the connector assembly of the present invention.

By providing the higher speed serializer/deserializer (SerDes) data and power for the transceiver (DC low voltage) rather than the lower speed 4 pair 1000 Base-T electrical data (the signals that are typically used) through the wet mate connector assembly, the electronics in the active cable can be limited to just the transceiver. The rest of the electronics, such as the RJ-connector, electrical transformers, power regulation, and physical layer (PHY) switch chipset, which are required to connect standard RJ electrical Ethernet cable signals to the SerDes signal used by the transceiver, all reside inside the bulkhead of the wet mate connector assembly within the water proof and pressure proof chamber behind the connector interface. This configuration allows the size of the active cable heads to be minimized and easily packaged in space typically used by wet mate electrical connector systems. Furthermore, numerous variations are provided for connecting the active cable plug end to the connecting bulkhead connector or another free connector plug end via a threaded mate or a bayonet mate.

The foregoing has outlined, rather broadly, the preferred features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiments as a basis for designing or modifying other structures for carrying out the same purposes of the present invention, and that such other structures do not depart from the spirit and scope of the invention in its broadest form.

BRIEF DESCRIPTION OF THE DRAWINGS

FIGS. 11a-11e are different views of a mount for a gigabit transceiver and attached electrical connector.

DETAILED DESCRIPTION OF THE PREFERRED EMBODIMENTS

Figure 1:
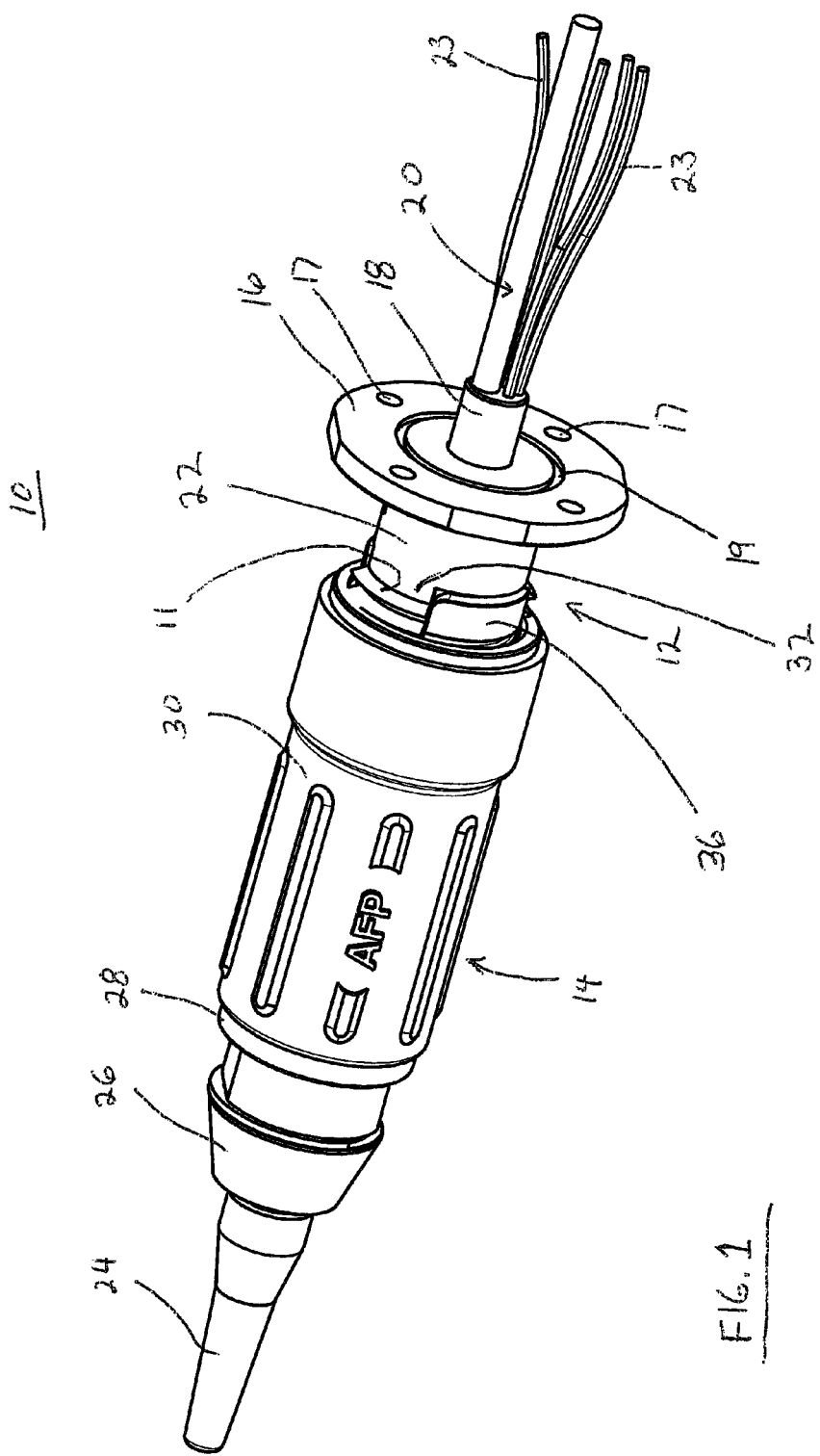
FIG. 1 is a perspective view of a wet mateable connector assembly configured in accordance with the present invention, wherein a grip ring of a screw ring connector is in an extended position.
Figure 2:
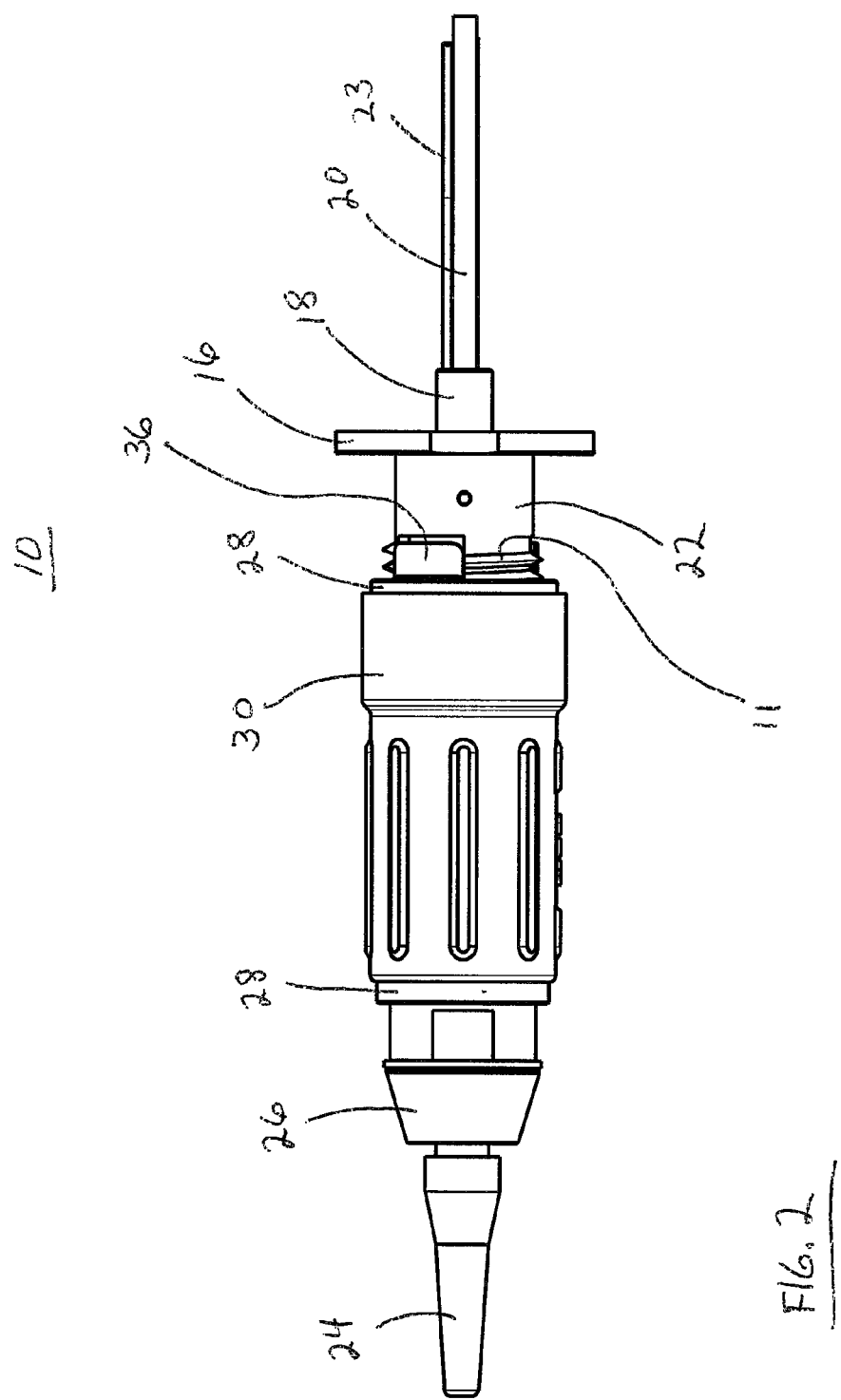
FIG. 2 is a side view of the wet mateable connector assembly shown in FIG. 1.

Referring now to the drawings, FIGS. 1 and 2 illustrates a perspective view and a side view, respectively, of a wet mateable connector assembly 10 configured in accordance with the present invention. The wet mateable connector assembly 10 includes a bulkhead mount 12 and a wet mateable connector 14. In this illustrated embodiment, the bulkhead mount 12 includes a circular base 16 having mounting holes 17. The rear of the circular base 16 includes a wire tube enclosure 18 for enclosing power wire 20 and Ethernet connection wire 23. The wire tube enclosure 18 is preferably rubber molded over wires 20,23. An O-ring gasket 19 receptacle is located on the rear of the circular base 16 to form a hermetic seal when the circular base 16 is mounted to an appropriated structure. The front of the circular base 16 includes a circular post 22 to be mated with the wet mateable connector 14. The bulkhead mount 12 is preferably constructed of metal, such as stainless steel, and the post 22 and the circular base 16 are preferably formed as a unitary member. Screw threads 11 are located on the outer periphery of the post 22 for securing the bulkhead mount 12 to the grip ring 28.

The wet mateable connector 14 is comprised of a flexible optical fiber strain relief boot 24, a plug shell 26, a grip ring assembly or grip ring 28, and a non-slip grip 30 covering the grip ring 28. The plug shell 26 and the grip ring 28 are preferably constructed of stainless steel. The flexible fiber strain relief boot 24 and the non-slip grip 30 covering the grip ring 28 are preferably constructed of rubber or urethane.

FIGS. 1 and 2 illustrate the wet mateable connector assembly 10 before being fully connected or completely screwed onto the bulkhead mount 12. These views expose the post 22 having bulkhead male insert key 32 having mating threads 11 to form a screw locking mechanism. Also illustrated is a female plug receptacle key 36 for receiving and mating with the bulkhead male insert key 32.

Figure 3:
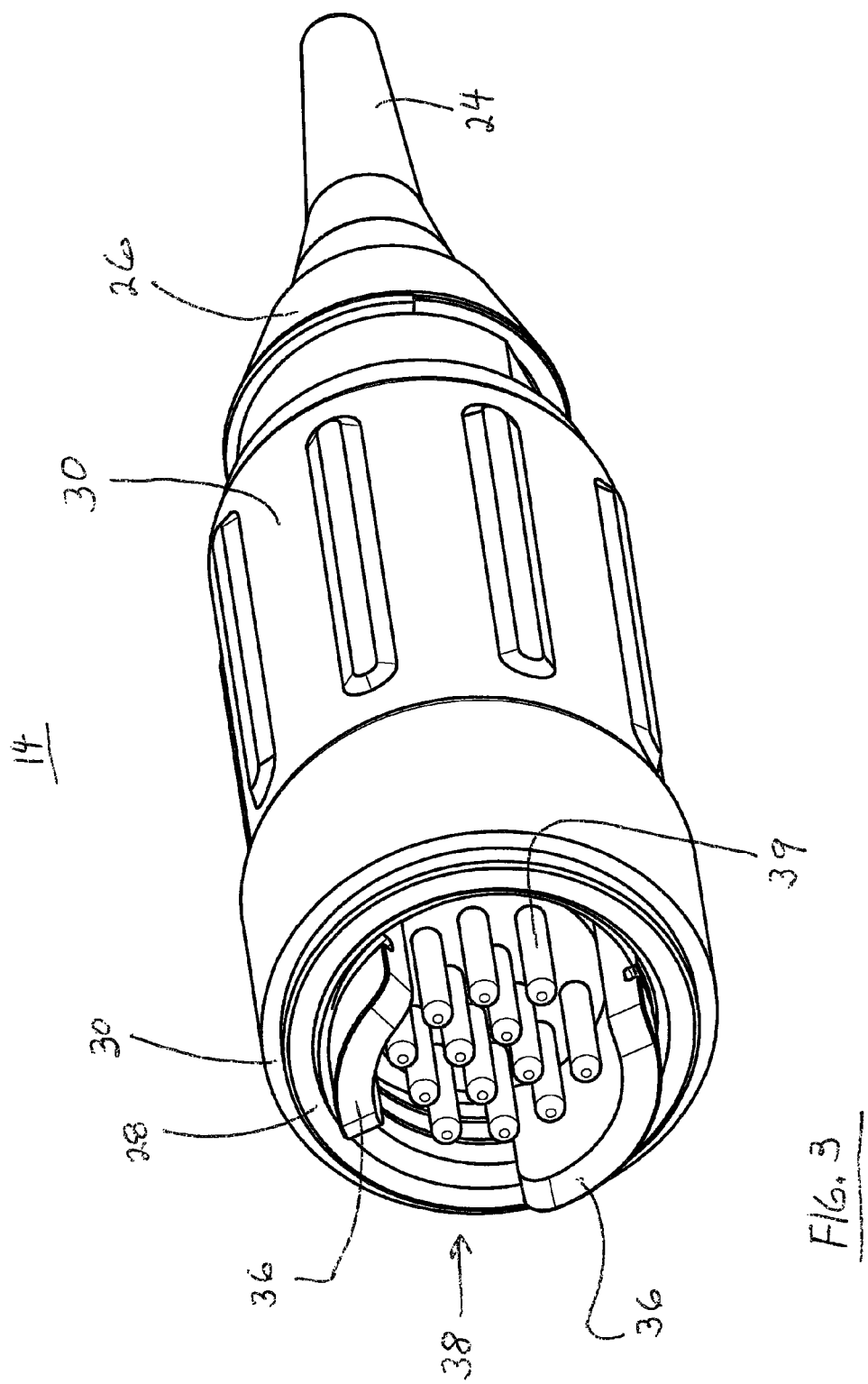
FIG. 3 is a side view of the wet mateable connector shown in FIGS. 1 and 2 disconnected from an electrical bulkhead mount.

FIG. 3 is an electrical end perspective view of the wet mateable connector 14 shown in FIGS. 1 and 2. A clear view is provided of the male connector plug 38 having multiple pins 39. Also illustrated are the flexible optical fiber strain relief boot 24, the plug shell 26, the grip ring 28, and the non-slip grip 30. Also illustrated is the female plug receptacle key 36 for receiving and mating with the bulkhead male insert key 32.

Figure 4:
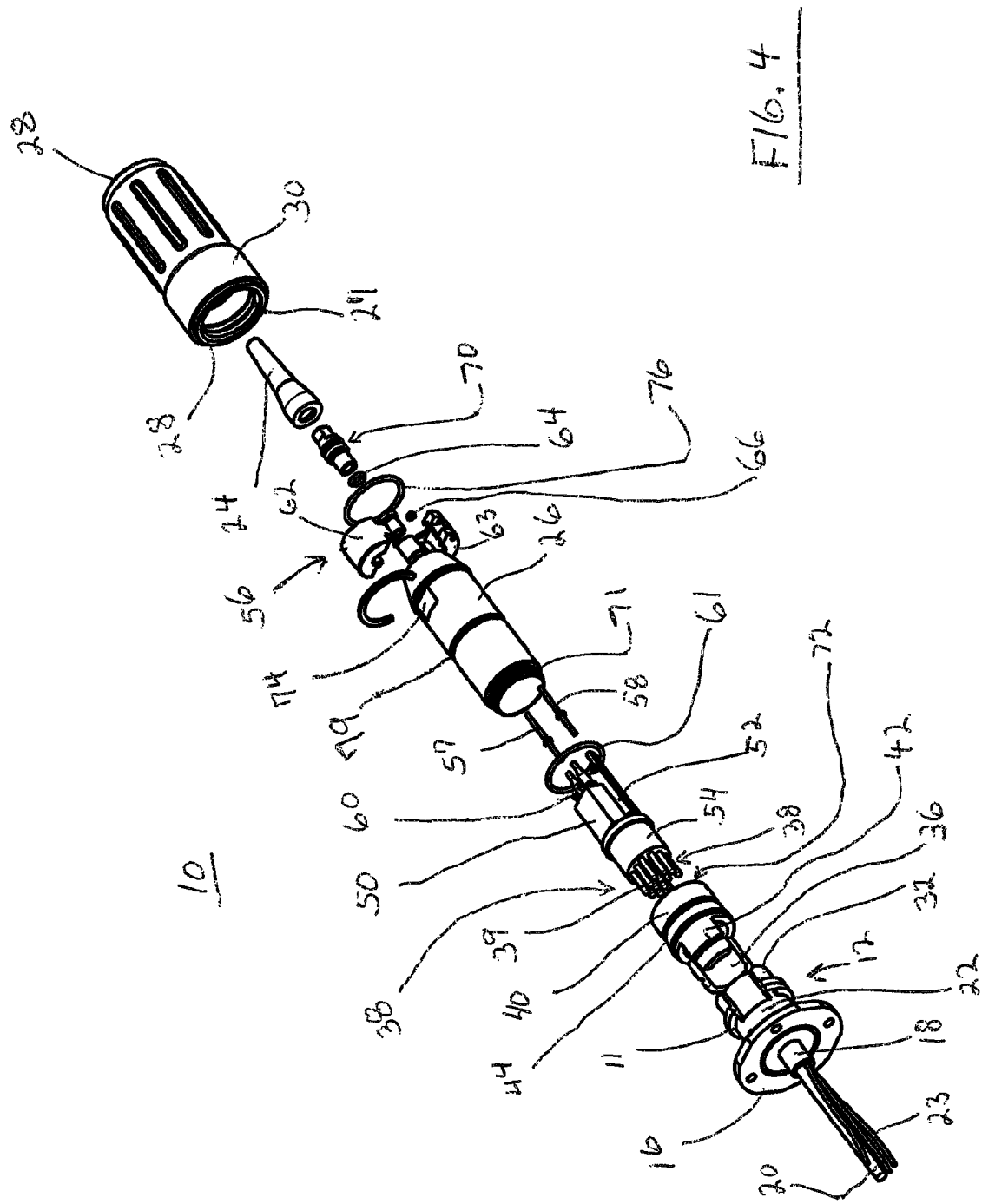
FIG. 4 is an exploded view of the wet mateable connector assembly shown in FIGS. 1 and 2.

FIG. 4 is an exploded view of the wet mateable connector assembly 10 shown in FIGS. 1 and 2. The bulkhead mount 12 is shown including the circular base 16 having holes 17, wire tube 12, and post 22. The post 22 includes a male insert key 32 having mating threads 11 to form a keyed screw locking mechanism. Also illustrated is a female plug receptacle 40 having a female plug receptacle key 36 for receiving and mating with the bulkhead male insert key 32. The female plug receptacle key 36 includes coupling thread 42 and an O-ring receptacle or circular ridge 44.

FIG. 4 also illustrates a gigabit transceiver 50 mounted to a printed circuit board (PCB) 52. The PCB 52 is mounted to an Ethernet plug 54 having the connector pins 39 of the male connector plug 38. The Ethernet plug 54 is connected to an optical fiber crimp assembly 56 by crimp rods 57,58. LC optical connectors 60 are shown connected to the gigabit transceiver 50. An O-ring 61 functions to provide a hermetic seal between the Ethernet plug 54 and the female plug receptacle 40.

The optical fiber crimp assembly 56 includes a two piece crimp support and adjustment 62,63. An O-ring 64 functions as a hermetic seal for optical fibers passing though the optical fiber crimp assembly 56. Bolt nuts 66 are screwed onto the crimp rods 57,58 to secure and properly adjust the distance between the gigabit transceiver 50 and the optical fiber crimp assembly 56. A six millimeter optical fiber pass through and seal 70 is located within and between the flexible optical fiber strain relief boot 24 and the plug shell 26. The O-ring 64 is located adjacent to the optical fiber pass through and seal 70 within the plug shell 26. The O-ring 76 provides centering for the grip ring 28 and the plug shell 26.

The plug shell 26 includes screw threads 71 on the rear for screwing into a threaded end 72 of female plug receptacle 40. A circular indentation 79 within the plug shell 26 is sized for receiving an O-ring, and diametrically opposed flats 74 function to enable the tightening of plug shell 26 with a spanner.

Figure 5:
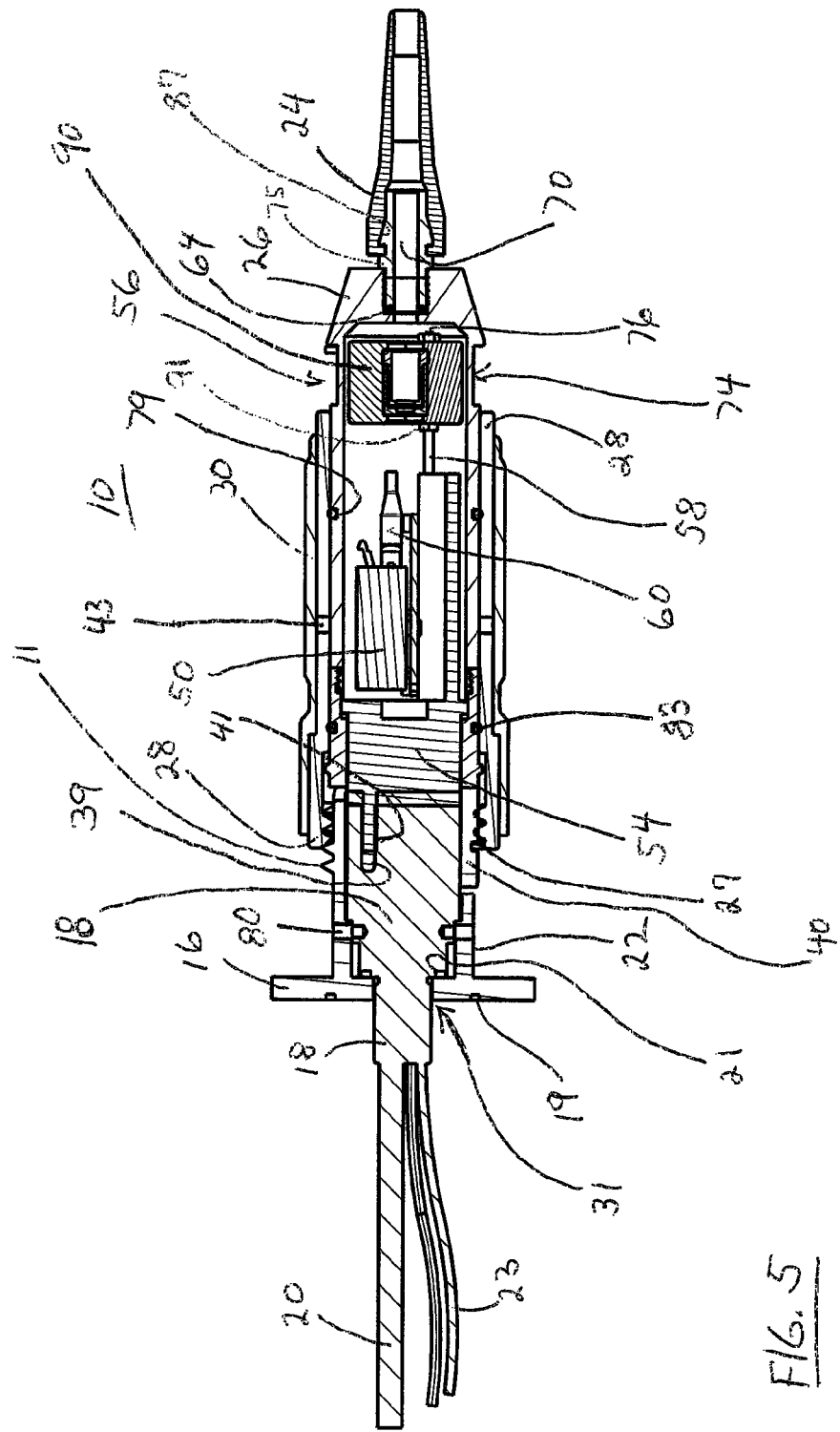
FIG. 5 is a cross-sectional view of the wet mateable connector assembly shown in FIGS. 1 and 2.

FIG. 5 shows a cross-sectional view of the wet mateable connector assembly 10 shown in FIGS. 1 and 2. The bulkhead mount 12 includes a circular base 16, electrical wire tube 18, O-ring receptacle 19, and post 22. Fixing grub screws 80 are located through the post 22. Mating threads 11 are located on the post 22, and corresponding mating threads 27 are located inside the grip ring 28. An O-ring 21 is located between the inside circular base 16 and the female plug receptacle 40. The electrical wire tube 18 extends from the female plug receptacle 40 and passes through an aperture 31 in the circular base 16. The female plug receptacle 40 and the electrical wire tube 18 are preferably formed as a unitary member from brass over-molded with rubber.

The Ethernet plug 54 is located within the plug shell 26. The Ethernet plug 54 interconnects with female plug receptacle key 36 via mated electrical pins and receptacle contacts. A cross section of one such mated connector pair 41 is shown. The plurality of mated pair connectors 41 connects the SerDes and external power supply to the gigabit transceiver 50. A pair of grub screws 43 is located on the outside perimeter of the grip ring 28 and functions to limit the range of travel of the grip ring 28 relative to the plug shell 26 to and from the mated condition. O-rings 79,83 provide centering and allow the grip ring 28 to move over plug shell 26 toward and away from the electrical connector end of the plug shell 26.

In accordance with the present invention, a miniature gigabit transceiver 50 is located on a PCB 52 which is mounted to an Ethernet wet mate electrical plug 54. LC optical fiber connectors 60 are optically connected to the gigabit transceiver 50. The gigabit transceiver 50 is located and hermetically sealed within the plug shell 26. A crimp support rod 58 is connected to crimp clamp 90 and secured in place by the nuts 76 and 91. The nuts 76, 91 can be adjusted to position the gigabit transceiver the desired distance from the optical fiber crimp assembly 56.

An O-ring 64 hermetically seals the optical fiber pass though and seal 70 to the plug shell 26. Flange 75 on the optical fiber pass through and seal 70 properly positions the optical fiber pass through and seal 70 on the optical end of the plug shell 26. Flange 87 on the optical fiber pass through and seal 70 properly positions and secured the flexible optical fiber strain relief boot 24 to the optical end of the plug shell 26.

Figure 6:
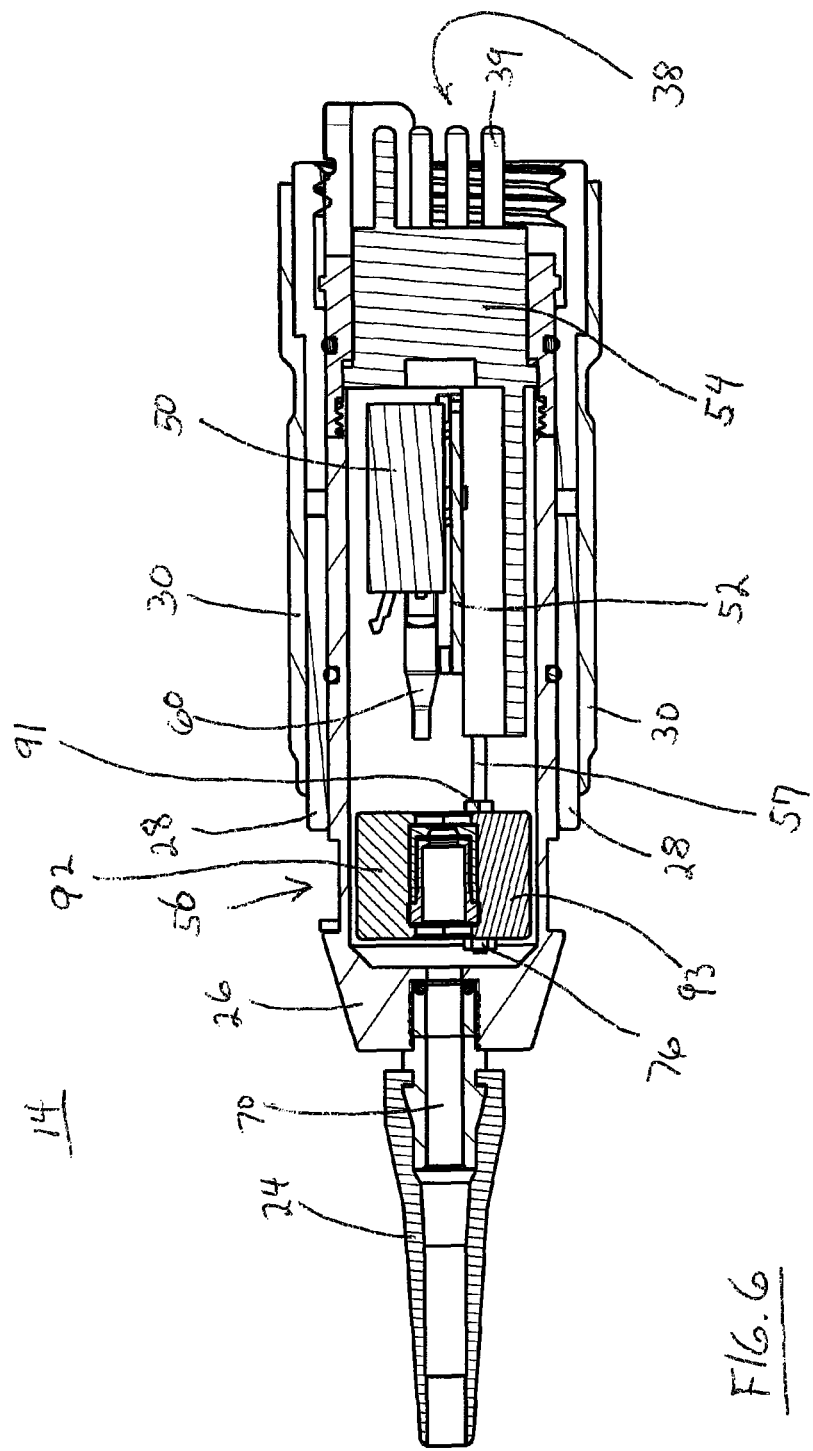
FIG. 6 is a cross-sectional view of the wet mateable connector shown in FIG. 3.

FIG. 6 illustrates a cross-sectional view of the wet mateable connector 14 shown in FIG. 3. Illustrated are the flexible optical fiber strain relief boot 24, the optical fiber pass through and seal 70, the plug shell 26, non-slip grip 30, the Ethernet plug 54, and the male connector plug 38 having multiple connector pins 39. The optical fiber crimp assembly 56 and the two piece crimp support and adjustment 92,92 also are illustrated. The nuts 76, 91 connected to the crimp support rod 57 properly positions the optical fiber crimp assembly 56 relative to the gigabit transceiver 50. The gigabit transceiver 50 is shown soldered to a printed circuit board (PCB) 52. The PCB 52 is attached to the Ethernet plug 54 by nuts 95 (FIG. 10).

Figure 7:
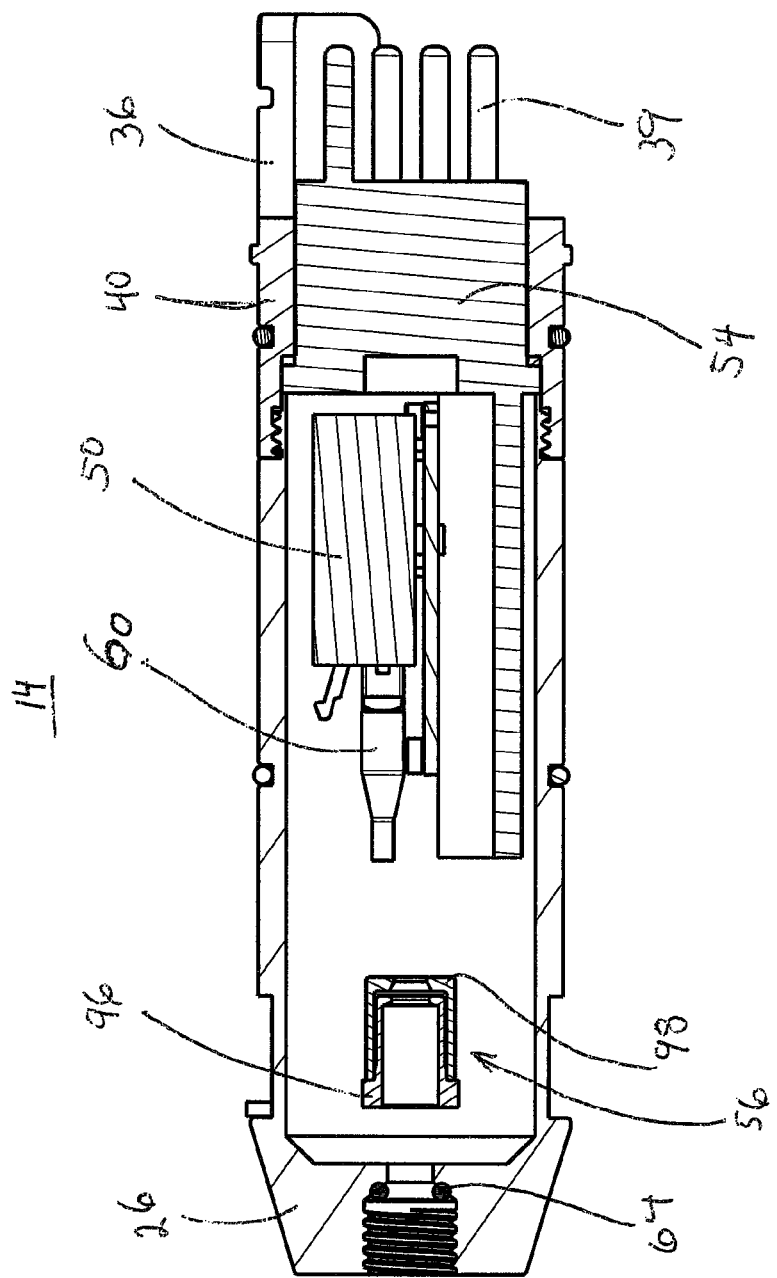
FIG. 7 is a cross-sectional view of the wet mateable connector assembly shown in FIG. 6 without several elements.

FIG. 7 is an enlarged view of the wet mateable connector 14 shown in FIG. 6 without the optical fiber relief boot 24, the optical fiber pass through and seal 70, grip ring 28, and non-slip grip 30. The plug shell 26 and O-ring 64 are illustrated. Also illustrated are the Ethernet plug 54, female plug receptacle 40 and female plug receptacle key 36, gigabit transceiver 50, and LC connector 70. FIG. 7 further provides a clearer view of the optical fiber crimp assembly 56 having interlocking elements 96,98. The two-piece stacking elements 96,98, wherein element 96 fits inside element 98 to secure and hold an optical fiber in place and provide strain relief by locking the fiber Kevlar® strength elements without damaging the optical fiber.

Figure 8:
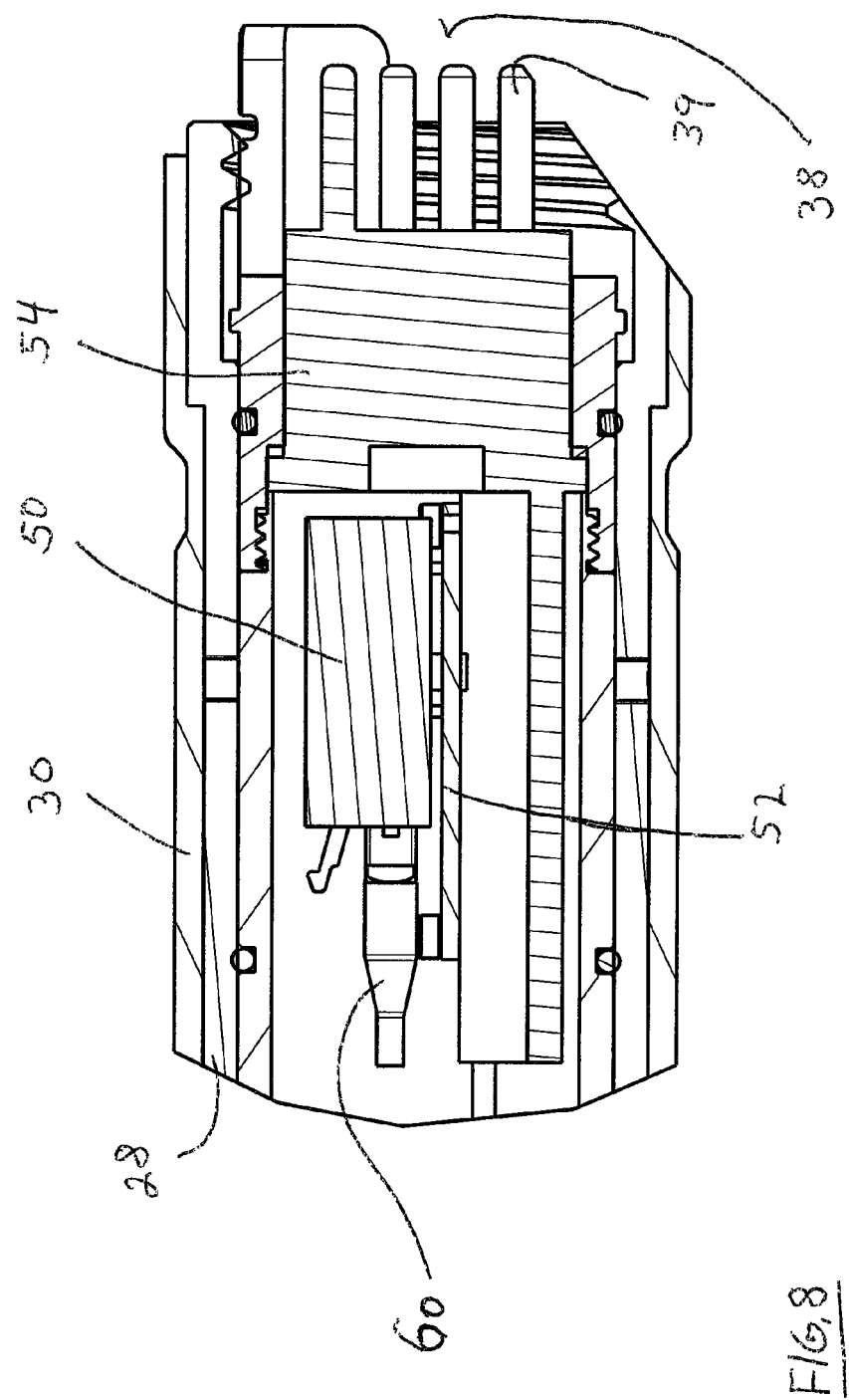
FIG. 8 is an enlarged cross-sectional view of the electrical connector end of the wet mateable connector shown in FIG. 6.

FIG. 8 is an enlarged cross-sectional view of the electrical end of the wet mateable connector 14 shown in FIG. 6. Shown is the gigabit transceiver 50 mounted to PCB 52. The PCB 52 is mounted to the Ethernet wet mate electrical plug 54 by nuts 95 (FIG. 10). The Ethernet wet mate electrical plug 54 is enclosed within the plug shell 26, the grip ring 28, and non-slip grip 30. The male connector plug 38 having multiple connector pins 39 also is shown in an enlarged view.

Figure 9:
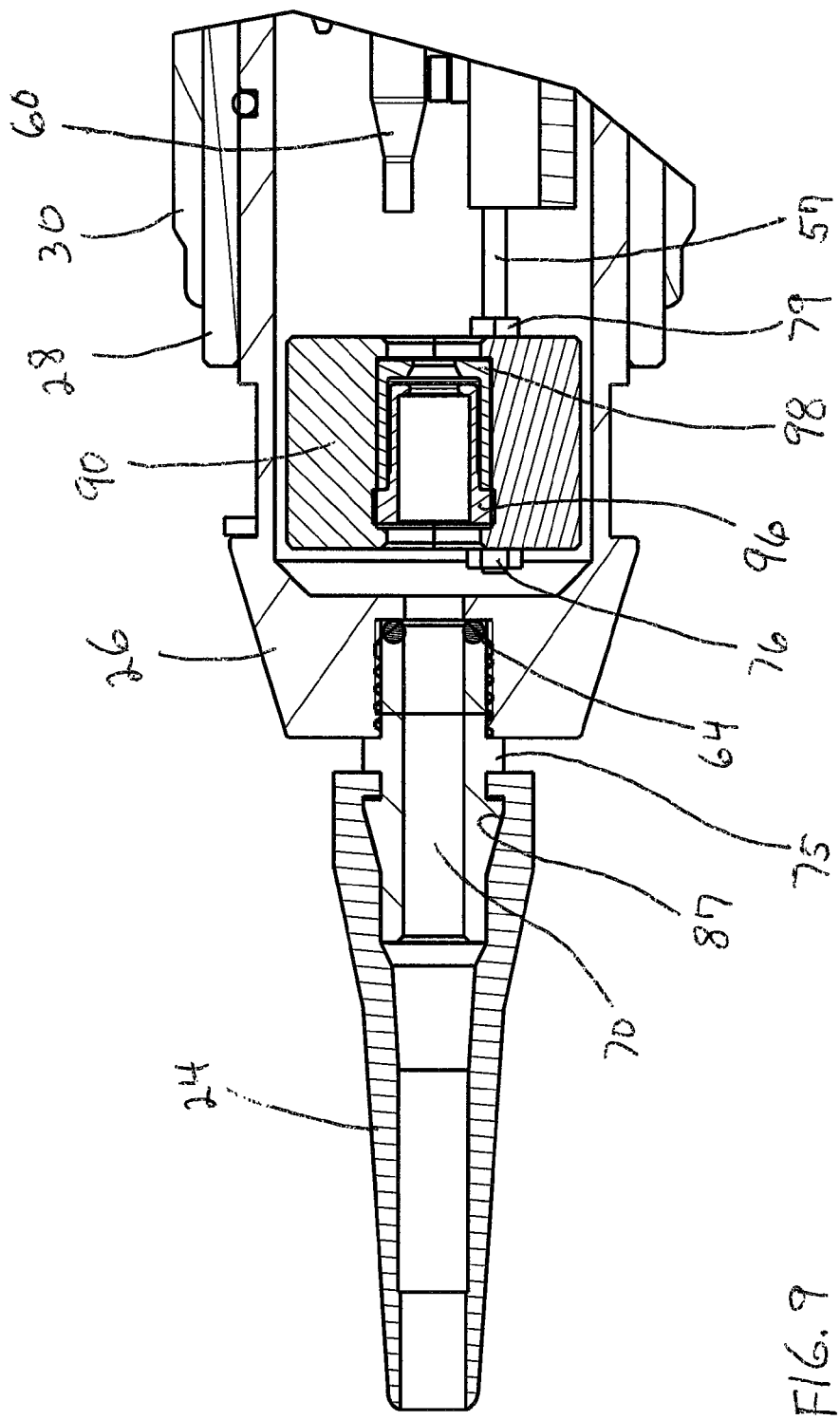
FIG. 9 is an enlarged cross-sectional view of the optical connector end of the wet mateable connector shown in FIG. 6.
Figure 10:
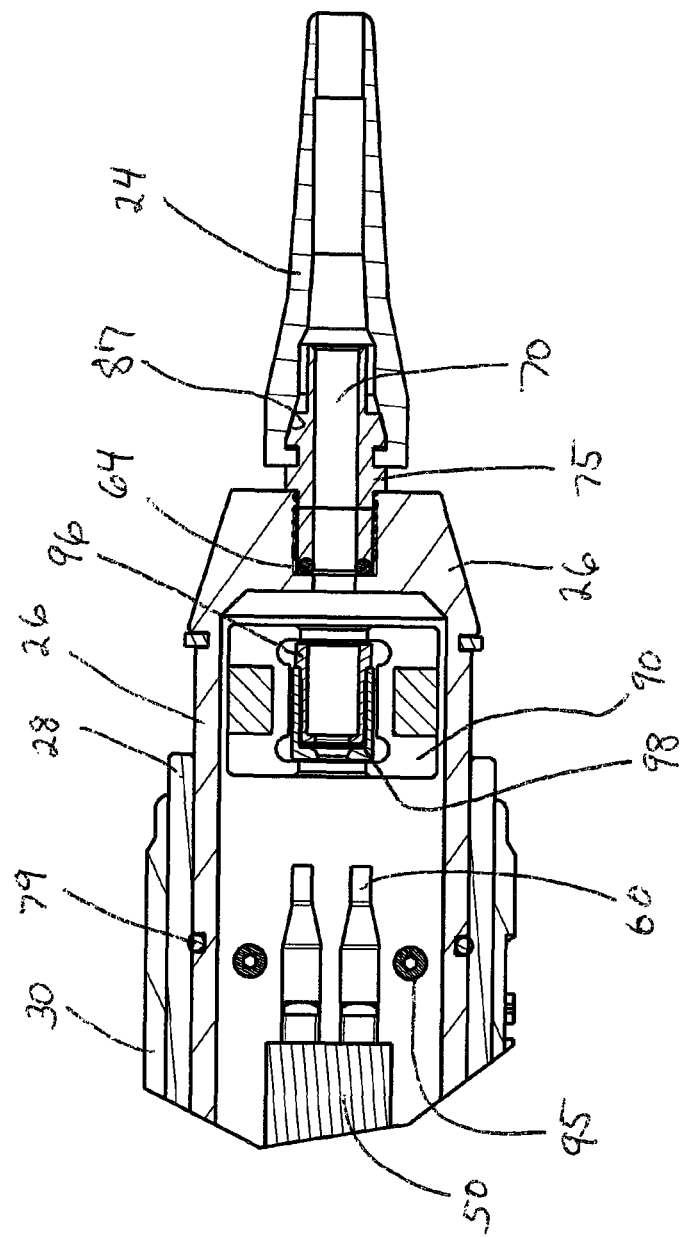
FIG. 10 is an enlarged cross-sectional top view of the optical connector end of the wet mateable connector shown in FIG. 6.

FIG. 9 is an enlarged cross-sectional view and FIG. 10 is an enlarged top cross-sectional view optical end of the wet mateable connector 14 shown in FIG. 6. Illustrated are the flexible optical fiber strain relief boot 24, the optical fiber pass through and seal 70, the plug shell 26, grip ring 28, and non-slip grip 30. Also illustrated are the gigabit transceiver 50 mounted to the PCB 52. An enlarged view of the optical fiber crimp assembly 56, which include two-piece stacking elements 96,98 wherein element 96 fits inside element 98 to secure and hold an optical fiber in place and provide strain relief by locking the fiber Kevlar® strength elements without damaging the optical fiber.

FIGS. 11a-11e show multiple enlarged views of the Ethernet wet mate electrical plug 54. FIG. 11a is a perspective view of the Ethernet wet mate electrical plug 54 with a mounting trough 102 for the PCB 52. Mounting holes 104 are included in the trough 102 to secure the PCB 52 to the Ethernet wet mate electrical plug 54. Male connector pins 39 are shown extending from the rear of the Ethernet wet mate electrical plug 54. Wires from the male pins exit the Ethernet plug 54 to connect power and SerDes data to the PCB 52 by soldering the wires to the PCB 52.

FIG. 11b is a side view of the Ethernet plug 54 shown in FIG. 11a, which also illustrates the male connector pins 39, mounting trough 102, and mounting holes 104. A flange 106 extends around the periphery of the Ethernet wet mate electrical plug 54 which provides a sealing surface when used in the complete assembly.

FIG. 11c is a top view of the Ethernet wet mate electrical plug 54 showing the male connector pins 39, flange 106, mounting trough 102, and mounting holes 104. FIG. 11d is a bottom view of the Ethernet wet mate electrical plug 54.

FIG. 11e is an end view of the Ethernet plug 54 showing the mounting trough 102 and flange 106. Also shown are mounting holes 108 used to secure the crimp support rods or adjustment rods 57,58 shown in FIG. 4.

The invention claimed is:

1. A gigabit wet mate active connector assembly for deep water environments, comprising:
    a housing extending longitudinally between a first end and a second end of the housing;
    a gigabit optical transceiver located within the housing;
    a wet mate electrical connector located on the first end of the housing and electrically connected to the gigabit optical transceiver;
    an optical pass through located on the second end of the housing;
    an optical fiber crimping apparatus; and
    an adjustable optical strain relief for positioning the optical fiber crimping apparatus longitudinally relative to the gigabit optical transceiver, thereby enabling an optical fiber mounted within the optical fiber crimping apparatus and optically connected to the gigabit transceiver to be linearly extended within the housing.

2. The gigabit wet mate active connector assembly of claim 1, wherein the wet mate electrical connector includes a plurality of connector pins extending longitudinally and perpendicular from a planar surface, and the planar surface functions as a part of the wet mate electrical connector by forcing out water on the planar surface when the wet mate electrical connector is connected to a receptacle socket having a contacting planar surface with apertures for receiving the connector pins.

3. The gigabit wet mate active connector assembly of claim 1, further comprising:
    a bulkhead mount connected to the wet mate electrical connector.

4. The gigabit wet mate active connector assembly of claim 1, wherein the adjustable optical strain relief includes two rods for slidably adjusting and securing the optical fiber crimping apparatus.

5. The gigabit wet mate active connector assembly of claim 4, wherein the two rods of the adjustable optical strain relief includes bolts for slidably adjusting the position of the optical crimping apparatus.

6. The gigabit wet mate active connector assembly of claim 1, further comprising:
    optical connectors for connecting optical fibers to the gigabit optical transceiver.

7. The gigabit wet mate active connector assembly of claim 6, wherein the optical connectors are LC connectors.

8. The gigabit wet mate active connector assembly of claim 1, wherein the housing is hermetically sealed to protect components contained inside the housing from being exposed to water external to the housing.

9. The gigabit wet mate active connector assembly of claim 1, wherein the bulkhead mount includes a wire tube and a post having an insert key.

10. The gigabit wet mate active connector assembly of claim 1, wherein the optical fiber crimping apparatus includes a two piece crimp assembly and adjustment.

11. The gigabit wet mate active connector assembly of claim 1, further comprising:
    a printed circuit board; and
    an Ethernet plug, wherein the gigabit optical transceiver is mounted to the printed circuit board, and the printed circuit board is mounted to the Ethernet plug.

12. The gigabit wet mate active connector assembly of claim 1, wherein the housing further comprises:
    a grip ring;
    a plug shell connected to the grip ring; and
    a flexible optical strain relief boot connected to the plug shell.

13. The gigabit wet mate active connector assembly of claim 11, wherein the Ethernet plug is a male connector plug having a plurality of electrical connector pins.

14. A hermetically sealed connector assembly for deep water environments, comprising:
    a housing having a first end and a second end, wherein the first end includes a wet mate electrical connector and the second end includes an optical pass though;
    an optical transceiver located within the housing, wherein the wet mate electrical connector is electrically connected to the optical transceiver;
    an optical fiber crimping apparatus; and an adjustable optical strain relief for slidably positioning the optical fiber crimping apparatus on linear rods relative to the optical transceiver, thereby enabling an optical fiber mounted within the optical fiber crimping apparatus and optically connected to the optical transceiver to be linearly extended within the housing.

15. The hermetically sealed connector assembly of claim 14, further comprising:
a wet mate bulkhead mount connected to the wet mate electrical connector.

16. A gigabit wet mate active connector assembly for deep water, comprising:
a housing extending longitudinally between a first end and a second end of the housing;
a gigabit optical transceiver located within the housing;
a wet mate electrical connector located on the first end of the housing and electrically connected to the gigabit optical transceiver;
an optical pass through located on the second end of the housing;
an optical fiber crimping apparatus;
an adjustable optical strain relief for positioning the optical fiber crimping apparatus longitudinally relative to the gigabit optical transceiver, thereby enabling an optical fiber mounted within the optical fiber crimping apparatus and optically connected to the gigabit transceiver to be linearly extended within the housing; and wherein the wet mate electrical connector includes a plurality of connector pins extending longitudinally and perpendicular from a planar surface, and the planar surface functions as a part of the wet mate electrical connector by forcing out water on the planar surface when the wet mate electrical connector is connected to a receptacle socket having a contacting planar surface with apertures for receiving the connector pins.

17. The gigabit wet mate active connector assembly of claim 16, further comprising:
a bulkhead mount having a wet mate receptacle which is connected to the wet mate electrical connector.

18. The gigabit wet mate active connector assembly of claim 17, wherein the wet mate electrical connector is an Ethernet plug, and the bulkhead mount includes an Ethernet socket.

19. The hermetically sealed connector assembly of claim 14, wherein the adjustable optical strain relief includes two rods and bolts for slidably adjusting and securing the optical fiber crimping apparatus.

20. The gigabit wet mate active connector assembly of claim 16, wherein the adjustable optical strain relief includes two rods and bolts for slidably adjusting and securing the optical fiber crimping apparatus.

* * * * *